(12) United States Patent
Han et al.

(10) Patent No.: US 8,782,520 B2
(45) Date of Patent: Jul. 15, 2014

(54) METHOD FOR DIFFERENTIATING HAPTIC FEELINGS BY A SELECT MENU OF A ROTARY SWITCH

(75) Inventors: Jae Sun Han, Seoul (KR); Deok Jin Yang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 356 days.

(21) Appl. No.: 13/071,728

(22) Filed: Mar. 25, 2011

(65) Prior Publication Data

US 2012/0131455 A1 May 24, 2012

(30) Foreign Application Priority Data

Nov. 22, 2010 (KR) .................. 10-2010-0115995

(51) Int. Cl.
*G06F 3/048* (2013.01)
*G06F 7/00* (2006.01)

(52) U.S. Cl.
USPC ........... 715/702; 715/810; 715/854; 345/184; 71/36

(58) Field of Classification Search
USPC ......... 715/700, 702, 765, 810, 835, 840, 841, 715/853, 854, 863; 345/173, 156, 184; 701/41, 42, 36
See application file for complete search history.

(56) References Cited

U.S. PATENT DOCUMENTS

| | | | | |
|---|---|---|---|---|
| 6,636,197 | B1 * | 10/2003 | Goldenberg et al. | ......... 345/156 |
| 7,680,574 | B2 | 3/2010 | Berg et al. | |
| 7,890,862 | B2 * | 2/2011 | Kompe et al. | .................. 715/702 |
| 8,159,461 | B2 * | 4/2012 | Martin et al. | .................. 345/169 |
| 8,533,599 | B2 * | 9/2013 | Son | ................. 715/727 |
| 2005/0017947 | A1 * | 1/2005 | Shahoian et al. | ............. 345/156 |
| 2007/0229455 | A1 * | 10/2007 | Martin et al. | .................. 345/156 |
| 2009/0140993 | A1 * | 6/2009 | Han et al. | ...................... 345/173 |
| 2010/0097198 | A1 * | 4/2010 | Suzuki | ....................... 340/407.2 |
| 2010/0201503 | A1 * | 8/2010 | Laurent et al. | ............. 340/407.2 |

FOREIGN PATENT DOCUMENTS

| | | |
|---|---|---|
| EP | 1980468 A2 | 10/2008 |
| JP | 2006347215 A | 12/2006 |
| KR | 1020030054920 | 7/2003 |
| KR | 1020040019082 | 3/2004 |
| KR | 100947729 | 12/2009 |
| KR | 10-2010-0119154 A | 11/2010 |

* cited by examiner

*Primary Examiner* — Xiomar L Bautista
(74) *Attorney, Agent, or Firm* — Edwards Wildman Palmer LLP; Peter F. Corless

(57) ABSTRACT

The present invention relates to a method for differentiating haptic feelings by a selection menu of a rotary switch, in which haptic feelings of the switch or rotary switch can be differentiated by each menu when scrolling the rotary switch in order to setup or select a variety of functions of an electronic product. Specifically, the haptic feelings by vibration and resistance against turning the switch are transferred to a user at different strengths when the user scroll-manipulates a switch to select a variety of menus, selects items of a first menu, transits first menu from the first menu to a second menu, and selects items of each second menu, so that the user can easily perceive the positions of the respective menus even without watching a cluster display window.

6 Claims, 6 Drawing Sheets

| | CLUSTER MENU POSITION | SHAPE OF HAPTIC FEELING STRENGTH OF HAPTIC SWITCH |
|---|---|---|
| (a) |  MAIN MENU |  |
| (b) |  FIRST LOWER MENU |  |
| (c) |  SECOND LOWER MENU |  |
| (d) |  MAIN MENU |  |

METHOD FOR DIFFERENTIATING HAPTIC FEELINGS BY A SELECT MENU OF A ROTARY SWITCH

CROSS-REFERENCE TO RELATED APPLICATION

This application claims the benefit under 35 U.S.C. §119(a) of Korean Patent Application No. 10-2010-0115995 filed in the Korean Intellectual Property Office on Nov. 22, 2010, the entire contents of which are incorporated herein by reference.

BACKGROUND OF THE INVENTION (a) Field of the Invention

The present invention relates to a method for differentiating haptic feelings by a selection menu of a rotary switch, and more particularly, such a method for differentiating haptic feelings by a selection menu of a rotary switch, in which haptic feelings of the rotary switch can be differentiated by each menu when scrolling the rotary switch in order to setup or select a variety of functions of an electronic product.

(b) Background Art

Haptics is a field of technology that enables various kinds of information to be provided to a user using the user's sense of touch or tactile sensation. In the haptic technology, a process is researched in which a human being mainly perceives a sense of touch and recognizes an object or generates emotion, and the process has been incorporated into devices and the like for providing information.

Such a haptic technology is applied to a range of different fields including cellular phones, motor vehicles, robots expressing sentiments, etc. In addition, haptic-related products are manufactured through a series of processes including recognition of a tactile sensation, modeling and rendering of the tactile sensation, production of a tactile sensation-creating device, and so forth, according to stages for creating an artificial tactile sensation. Examples of the manufactured haptic-related product include a touch manipulation switch of a cellular phone, a rotary switch mounted at a steering wheel to control a menu of a motor vehicle cluster, etc.

Meanwhile, a steering wheel of a motor vehicle is intensively equipped with various switch devices. Thus, as the number of a variety of automotive convenience accessories and electrical equipments are increased, the number of switches mounted on the steering wheel may also increase to improve convenience in their manipulation by a driver. However, increasing the number of switches mounted on the steering wheel can cause confusion to the driver and thereby decrease driving safety because a driver distracts his or her attention to the steering wheel to manipulate the switches during the driving of a vehicle.

To tackle this disadvantage, Korean Patent No. 10-0947729 discloses a haptic steering wheel switch device which is constructed to allow a user to feel a tactile sensation through vibration and resistance against turning the switch. The haptic steering wheel switch device disclosed provides a haptic rotary switch unit having a haptic rotary switch driver mounted in a steering wheel and is configured to generate a rotational force. The haptic steering wheel switch also includes a haptic rotary switch knob configured to receive the rotational force generated from the haptic rotary switch driver; and a haptic rotary switch sensing unit having a haptic rotary switch sensor and a haptic rotary switch sensor counterpart.

However, this conventional haptic steering wheel switch device suffers from one or more disadvantages in that whenever the driver manipulates the haptic rotary switch to select various menus on the haptic rotary switch, the tactile sensations by vibration and resistance against turning the switch for respective menus are transferred to the driver at the same haptic feeling strength, so that it becomes difficult to determine which menu was selected without looking at the menu itself thereby defeating the purpose of using a haptic switch all together. Consequently, since the driver must continue to watch a cluster display window on which menus are being displayed during the driving of the vehicle, driving safety is again degraded.

The information disclosed in this Background of the Invention section is only for enhancement of understanding of the background of the invention and should not be taken as an acknowledgment or any form of suggestion that this information forms the prior art that is already known to a person skilled in that art.

SUMMARY OF THE INVENTION

The present invention relates to a system and method for differentiating haptic feelings by a selection menu of a rotary switch, in which the haptic feelings by vibration and resistance against turning the switch are transferred to a user at different strengths when the user scroll-manipulates a haptic rotary switch to select a variety of menus, selects items of a main menu, transits a rotary switch menu from the main menu to a lower menu, and selects items of each lower menu, so that the user can easily perceive the positions of the respective menus without watching a cluster display window.

In order to accomplish the above object, in one aspect, the present invention provides a method for differentiating haptic feelings by a selection menu of a rotary switch, the method including a step of expressing the haptic feelings via vibration and resistance against turning the switch at different strengths when the user selects a variety of menus while scroll-manipulating a haptic rotary switch to implement various kinds of functions of an electronic product, selects items of a main menu, transits a rotary switch menu from the main menu to a lower menu or from the lower menu to the main menu, and selects items of each lower menu.

In accordance with an embodiment of the present invention, the haptic feeling strength relating to the main menu and the lower menu may be adjusted to be set to a strong feeling, a normal feeling, or a mild feeling based on a user selection mode.

In addition, when the respective items of the main menu and the lower menu are scrolled, the haptic feeling strengths may be set differently from each other.

More specifically, in accordance with an embodiment of the present invention, a haptic feeling strength when the rotary switch menu is transited/changed from the main menu to the lower menu or from the lower menu to the main menu may be set to be greater than a haptic feeling strength when the items of the main menu and each lower menu are scrolled.

More specifically, in accordance with an embodiment of the present invention, in the case where the items of the main menu and each lower menu are scrolled, a haptic feeling strength when an item position is transited from the uppermost item to the lowermost item or from the lowermost item to the uppermost item may be set to be greater than a haptic feeling strength when the items positioned between the uppermost item and the lowermost item are scrolled.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like. The present systems will be particularly useful with a wide variety of motor vehicles.

BRIEF DESCRIPTION OF THE DRAWINGS

The objects, features and advantages of the present invention will be more apparent from the following detailed description in conjunction with the accompanying drawings, in which.

Figure 1:
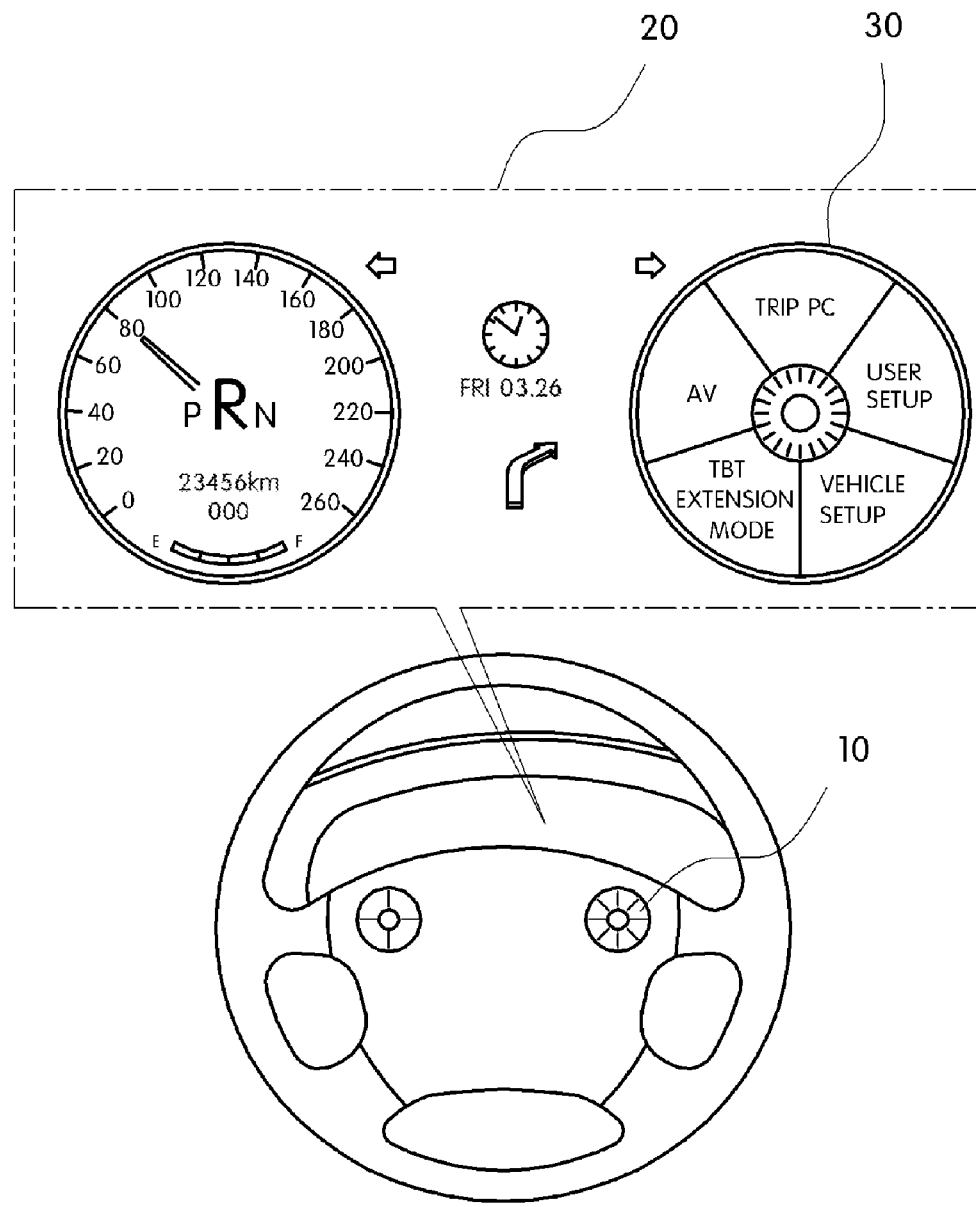
FIG. 1 is a schematic view illustrating an example of installation of a haptic rotary switch according to an exemplary embodiment of the present invention in a steering wheel.

Reference numerals set forth in the Drawings includes reference to the following elements as further discussed below:

| 10: haptic rotary switch | 20: cluster display window |
|---|---|
| 30: main menu | 32: first lower menu |
| 34: second lower menu | |

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Now, an exemplary embodiment according to the present invention will be described hereinafter in detail with reference to the accompanying drawings.

The present invention is directed to a haptic rotary switch that is mounted to and incorporated with a variety of electronic devices (cellular phones, robots, etc.) so as to transfer information by tactile sensation and vibration to a user. For the sake of better understanding of the present invention, an example will be described hereinafter where the haptic rotary switch is mounted at a steering wheel of a vehicle.

As shown in FIG. 1, a haptic rotary switch 10 is mounted at the steering wheel of the vehicle. A menu select screen by scroll manipulation of the haptic rotary switch 10, and a cluster display window 20, e.g., a full TFT-LCD cluster display window, is installed in front of a driver's seat.

In particular, the haptic rotary switch 10 includes a vibration motor (not shown) for transferring a tactile sensation by vibration and resistance against turning the switch to a user. The vibration motor is connected to a controller (not shown) for controlling the strength of vibration, and the like.

In order to implement various kinds of functions of the vehicle, a menu selected by the scroll manipulation of the haptic rotary switch 10 is composed of a main menu 30 (e.g., a menu for vehicle state setting such as, for example, dashboard setup, control of trip computers and/or AV systems, door locking, seat position adjustment, etc.), a first lower menu 32 configured as a submenu of the main menu (e.g., submenu for the vehicle state setting such as, for example, door automatic locking, ingress/egress-seat interlocking, etc.), and a second lower menu 34 configured as a submenu of the first lower menu 32 (e.g., a submenu for the door automatic locking such as, for example, turn-on/off of lock/unlock sound).

The present invention provides haptic feelings by vibration and resistance against turning the switch for respective menus expressed at different strengths, i.e., the vibration strengths and the like of the vibration motor are differently expressed in response to a control signal outputted from the controller when a driver selects a variety of menus while scroll-manipulating the haptic rotary switch 10.

In other words, the haptic feelings by vibration and resistance against turning the switch are expressed at different strengths when the driver scrolls the haptic rotary switch 10 to select the items of the main menu 30 while scroll-manipulating the haptic rotary switch 10, transits a rotary switch menu from the main menu 30 to the first lower menu 32 or from the first lower menu 32 to the main menu 30, transits the rotary switch menu from the first main menu 32 to the second lower menu 34 or from the second lower menu 34 to the first lower menu 32, and scrolls the haptic rotary switch 10 to select the respective items of the lower menus 32 and 34, so that the driver can perform a blind control without watching the cluster screen on which the respective menus are displayed, thereby promoting safe driving by allowing the driver to keep his or her eyes on the road.

Accordingly, when the driver scrolls the haptic rotary switch 10 to select the items of the main menu 30 and the lower menus 32 and 34, and transits the rotary switch menu from the main menu 30 to the lower menus 32 and 34 or from the lower menus 32 and 34 to the main menu 30, the controller controls the magnitude and waveform of an electric current applied to the vibration motor to cause the vibration strength of the vibration motor to be adjusted, so that the driver can feel different haptic feelings accordingly.

The haptic feeling strength (for example, the vibration strength of the vibration motor) by the main menu and the lower menu may be adjusted to be set to either a strong feeling, a normal feeling, or a mild feeling based on a user select mode.

Figure 2A:
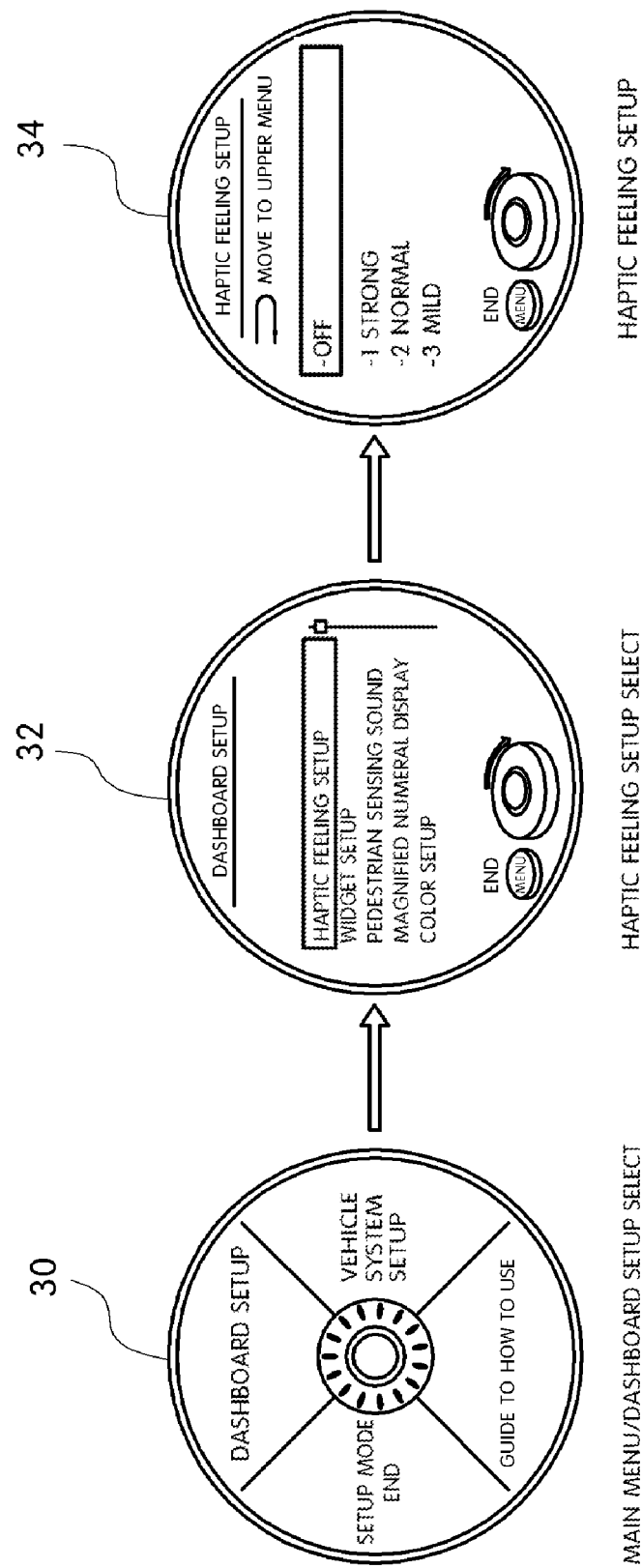
FIGS. 2a to 2c are schematic views illustrating an example of adjustment of a haptic feeling strength of a haptic rotary switch according to an exemplary embodiment of the present invention.
Figure 2B:
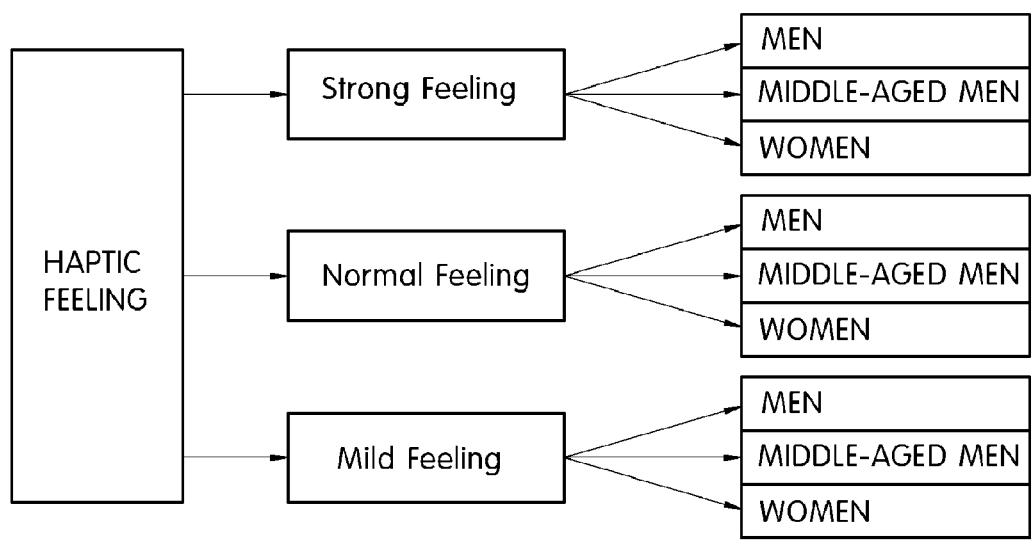
Figure 2C:
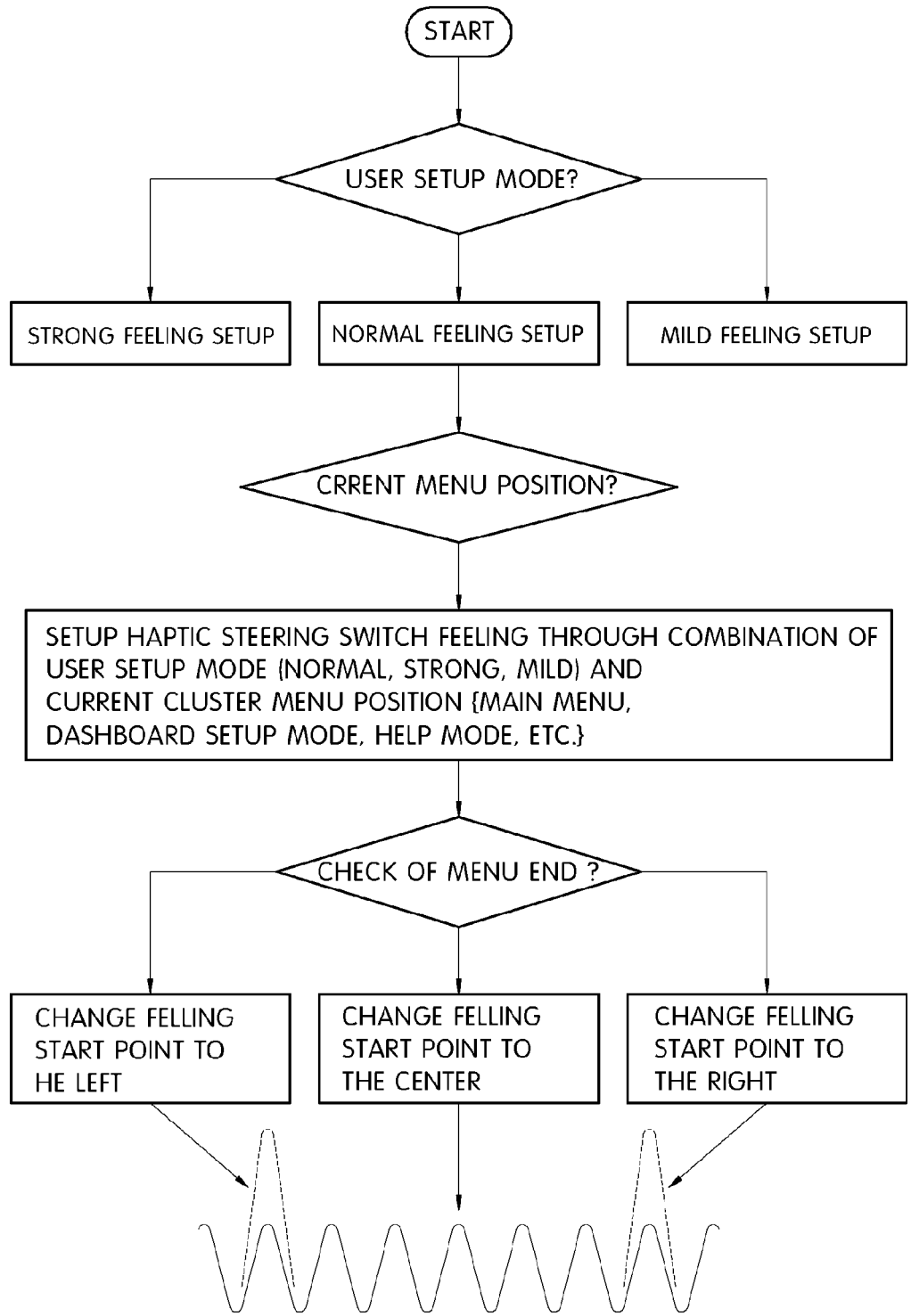

More specifically, among general men and middle-aged and elderly men, and men and women, there is a difference in a degree of haptic feeling which they can or cannot feel. Thus, as shown in FIGS. 2b and 2c, each of the strong feeling, the normal feeling, and the mild feeling is set to be divided into three groups including general men, middle-aged and elderly men, and women.

In addition, a degree of haptic feeling based on the user select mode may be adjusted, and the haptic feelings for the main menu and each lower menu displayed on the cluster screen may be set to different strengths. As shown in FIG. 2c, when a haptic feeling start point of the haptic rotary switch is set to the center thereof, the haptic feeling is intended to be provided to the menus at both ends or at vertical ends from the center of the haptic rotary switch at an equal strength when scrolling the switch. When the menu items at the both ends or the vertical ends are reached, the haptic feeling is intended to be provided to the menu items at a higher strength.

It is to be of course noted that the haptic feeling start point of the haptic rotary switch may be set to the menu items at the both ends or the vertical ends of, but not the center of the haptic rotary switch. Similarly, even in this case, the haptic feeling is intended to be provided to the menu items at the both ends or the vertical ends of the haptic rotary switch at a higher strength. Also, when scrolling the items positioned between the menu items at the both ends or the vertical ends of the haptic rotary switch, the haptic feeling is intended to be provided to the scrolled items at an equal strength.

Additionally, when scrolling the respective items of the main menu 30 and the lower menus 32 and 34, the haptic feeling strengths are set differently from each other.

Figure 3A:
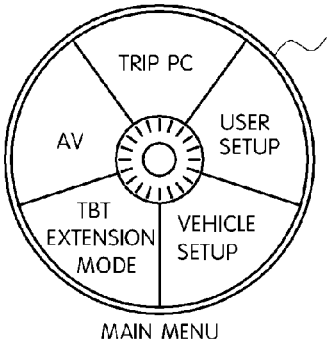
FIGS. 3a and 3b are schematic views illustrating an example of differentiation of a haptic feeling strength upon the scrolling of the haptic rotary switch to select a menu of the haptic rotary switch according to an exemplary embodiment of the present invention.
Figure 3A:
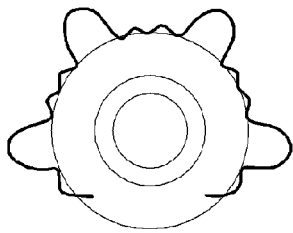
Figure 3A:
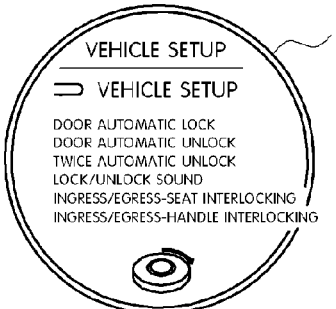
Figure 3A:
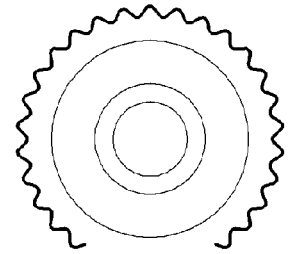
Figure 3A:
Figure 3A:
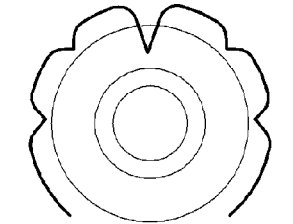
Figure 3A:
Figure 3A:
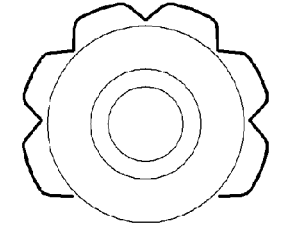

That is, as shown in FIG. 3a, a haptic feeling strength relating to the transition of a rotary switch menu from one item to another item when scrolling each item of the main menu 30, a haptic feeling strength according to the transition of the rotary switch menu from one item to another item when scrolling each item of the first lower menu 32, and a haptic feeling strength according to the transition of the rotary switch menu from one item to another item when scrolling each item of the second lower menu 34 are controlled to be different from one another. Thus, the driver can easily perceive whether a cursor is currently positioned on the main menu or the first and second lower menus through the haptic feeling strength even without watching the menus state displayed on the cluster screen.

Figure 3B:
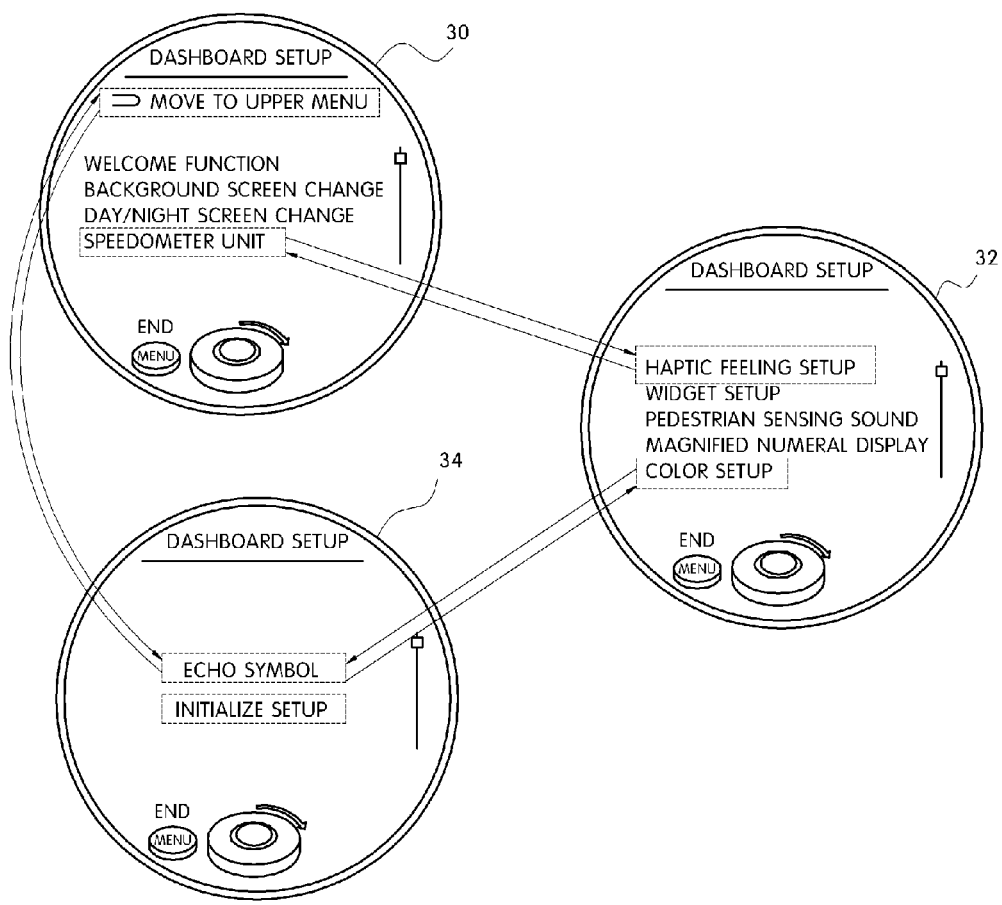

Also, as shown in FIG. 3b, a haptic feeling strength when the rotary switch menu is transited from the main menu 30 to the first and second lower menus 32 and 34 or from the first and second lower menus 32 and 34 to the main menu 30 is set to be greater than a haptic feeling strength when the items of the main menu 30 and each lower menu 32 or 34 are scrolled. Thus, the user can easily perceive whether the rotary switch menu is transited from the main menu to the lower menus or from the lower menus to the main menu even without watching the menu state displayed on the cluster screen personally.

Further, in the case where the items of the main menu 30 and each lower menu 32 or 34 are scrolled, i.e., the menu items are not selected but continue to be scrolled, a haptic feeling strength when an item position is transited from the uppermost item to the lowermost item or from the lowermost item to the uppermost item is be set to be greater than a haptic feeling strength when the items positioned between the uppermost item and the lowermost item are scrolled. Thus, the driver can easily perceive that a cursor is currently being moved from the uppermost item to the lowermost item even without watching the menu displayed on the cluster screen.

Likewise, a haptic feeling strength of the rotary switch is differentiated by each menu when scrolling the haptic rotary switch in order to select a variety of functions of an electronic product, so that the user can perform a blind control. In particular, in the case where the haptic rotary switch is applied to a vehicle, the driver can easily select the menus even without watching the cluster display screen, thereby promoting safe driving in a situation where the driver continues to gaze at the front of a vehicle during the driving of the vehicle.

Advantageously, the present invention provides a differentiated haptic feeling strength for each menu of the rotary switch when scrolling the haptic rotary switch in order to select a variety of functions of an electronic product, so that a blind control by the user is possible.

For example, a haptic rotary switch may be installed on a steering wheel of a vehicle, and haptic feeling strengths of the rotary switch by each menu may be set differently from each other so that when scrolling the haptic rotary switch in order to select a variety of menus (e.g., for vehicle state setting such as the position adjustment of the door and seat, and manipulation and setup of a trip computer, an AV system, etc.) displayed on the cluster display screen. Therefore, the user can easily perceive a current menu item and position through his or her full knowledge of the haptic feeling strengths of each menu respectively, so that he or she can perform a blind control to effect switch manipulation and menu selection even without watching the cluster display screen and can induce safe driving by looking straight ahead.

The invention has been described in detain with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for differentiating haptic feelings of a selection menu using a rotary switch, the method comprising the steps of:
   expressing the haptic feelings by vibration and resistance against turning the rotary switch at different strengths when a user,
      selects from a variety of menus while scroll-manipulating the rotary switch to implement various kinds of functions of an electronic product,
      selects items from a main menu,
      transits a rotary switch menu from the main menu to a lower menu or from the lower menu to the main menu, and
      selects items from the lower menu,
   wherein a haptic feeling strength when the rotary switch menu is transited from the main menu to the lower menu or from the lower menu to the main menu is set to be greater than a haptic feeling strength when the items of the main menu and the lower menu are scrolled,
   the haptic feeling strength by the main menu and the lower menu is adjusted to be set to a strong feeling, a normal feeling, and a mild feeling based on a user selection mode, and
   each of the strong feeling, the normal feeling, and the mild feeling is set to be divided into three groups of: first users including general men, second users including middle-aged and elderly men, and third users including women.

2. The method according to claim 1, wherein when the respective items of the main menu and the lower menu are scrolled, the haptic feeling strengths are set differently from each other.

3. The method according to claim 1, wherein when the items of the main menu and the lower menu are scrolled, a haptic feeling strength when an item position is transited from the uppermost item to the lowermost item or from the lowermost item to the uppermost item is set to be greater than a haptic feeling strength when the items positioned between the uppermost item and the lowermost item are scrolled.

4. A system for differentiating haptic feelings of a selection menu using a rotary switch, the system comprising:
   a switch configured to express haptic feelings through vibration and resistance against turning the switch at different strengths when the user,
      selects a variety of menus while scroll-manipulating the switch,
      selects items of a first menu of the variety of menus,
      transits the first menu from the first menu to a second menu or from the second menu to the first menu, and
      selects items from the second menu,
   wherein a haptic feeling strength when the first menu is transited from the first menu to the second menu or from the second menu to the first menu is set to be greater than a haptic feeling strength when the items of the first menu and the second menu are scrolled, the haptic feeling strength by the main menu and the lower menu is adjusted to be set to a strong feeling, a normal feeling, and a mild feeling based on a user selection mode, and each of the strong feeling, the normal feeling, and the mild feeling is set to be divided into three groups of: first users including general men, second users including middle-aged and elderly men, and third users including women.

5. The system according to claim 4, wherein when the items of the first menu and the second menu are scrolled, a haptic feeling strength when an item position is transited from the uppermost item to the lowermost item or from the lowermost item to the uppermost item is set to be greater than a haptic feeling strength when the items positioned between the uppermost item and the lowermost item are scrolled.

6. The system according to claim 4, wherein when the respective items of the first menu and the second menu are scrolled, the haptic feeling strengths are set differently for each item.

* * * * *